(12) United States Patent
Hausman (10) Patent No.: US 12,188,719 B2
(45) Date of Patent: Jan. 7, 2025

(54) BOTANICAL PROCESSING MODULE

(71) Applicant: Brian Hausman, Houston, TX (US)

(72) Inventor: Brian Hausman, Houston, TX (US)

(73) Assignee: Hausman Properties, LLC, Houston, TX (US)

( * ) Notice: Subject to any disclaimer, the term of this patent is extended or adjusted under 35 U.S.C. 154(b) by 1164 days.

(21) Appl. No.: 15/931,773

(22) Filed: May 14, 2020

(65) Prior Publication Data

US 2021/0247138 A1 Aug. 12, 2021

Related U.S. Application Data

(60) Provisional application No. 62/847,393, filed on May 14, 2019.

(51) Int. Cl.
*F26B 15/18* (2006.01)
*A23N 12/08* (2006.01)
*F26B 21/10* (2006.01)

(52) U.S. Cl.
CPC ............ *F26B 15/18* (2013.01); *A23N 12/083* (2013.01); *F26B 21/10* (2013.01)

(58) Field of Classification Search
None
See application file for complete search history.

(56) References Cited

U.S. PATENT DOCUMENTS

| | | | | |
|---|---|---|---|---|
| 2,240,841 | A * | 5/1941 | Flynn | B01F 27/112 241/98 |
| 3,729,096 | A * | 4/1973 | Fitzner | B07B 1/22 209/406 |
| 6,337,308 | B1 * | 1/2002 | Adams | B01F 33/83 366/302 |
| 6,562,763 | B2 * | 5/2003 | Adams | E21B 21/062 366/302 |
| 6,581,859 | B2 * | 6/2003 | Adams | B01F 25/451 241/101.8 |
| 8,002,979 | B2 * | 8/2011 | Bryan-Brown | E03C 1/2665 241/DIG. 38 |
| 9,393,505 | B2 * | 7/2016 | Rusconi Clerici | B04B 5/10 |
| 9,492,854 | B2 * | 11/2016 | Slanina | B09B 5/00 |
| 11,013,260 | B1 * | 5/2021 | Schreiber | A24B 7/04 |
| 11,911,719 | B2 * | 2/2024 | Brancazio | B01D 29/608 |
| 12,036,485 | B1 * | 7/2024 | Smith | B01D 11/0288 |
| 12,053,750 | B2 * | 8/2024 | Zhang | B01F 27/17 |

(Continued)

*Primary Examiner* — Robert J Popovics (57) ABSTRACT

The disclosure provides a botanical processing module, comprising a housing, wherein the housing comprises a plurality of surfaces, wherein there is an internal cavity defined between the plurality of surfaces; a first inlet disposed on a top surface of the housing; a second inlet disposed on a first side surface of the housing, wherein the first side surface is orthogonal to the top surface; a first outlet disposed on the first side surface; a controller, wherein the controller comprises a processor; a memory; and a display, wherein the display is disposed on a second side surface of the housing, wherein the second side surface is orthogonal to both the top surface and the first side surface; a grinder; and a first heating chamber; wherein the grinder and the first heating chamber are disposed within the internal cavity of the housing, wherein the first heating chamber is coupled to the grinder.

12 Claims, 4 Drawing Sheets

(56) References Cited

U.S. PATENT DOCUMENTS

| | | | | |
|---|---|---|---|---|
| 2008/0164191 | A1* | 7/2008 | Bryan-Brown | E03F 1/002 |
| | | | | 241/79 |
| 2012/0261320 | A1* | 10/2012 | Slanina | C05F 17/10 |
| | | | | 210/151 |
| 2015/0136683 | A1* | 5/2015 | Rusconi Clerici | B01D 33/00 |
| | | | | 210/368 |
| 2021/0086112 | A1* | 3/2021 | Brancazio | B01D 29/03 |
| 2021/0121793 | A1* | 4/2021 | Hausman | H04L 9/0643 |
| 2021/0247138 | A1* | 8/2021 | Hausman | F26B 15/18 |
| 2022/0117297 | A1* | 4/2022 | Schreiber | A61L 9/03 |
| 2022/0305448 | A1* | 9/2022 | Zhang | B01F 27/82 |
| 2024/0066443 | A1* | 2/2024 | Brancazio | B01D 29/86 |

\* cited by examiner

BOTANICAL PROCESSING MODULE

CROSS-REFERENCE TO RELATED APPLICATIONS

The present application claims priority to U.S. Provisional Application Ser. No. 62/847,393 filed on May 14, 2019 which is incorporated herein by reference in its entirety.

BACKGROUND

Current tools exist for separate manual processes of grinding, shredding, packing, and heating certain plant matter.

BRIEF DESCRIPTION OF THE DRAWINGS

For a more complete understanding of the present disclosure and its features and advantages, reference is now made to the following description, taken in conjunction with the accompanying drawing, in which.

DETAILED DESCRIPTION

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

The terms "couple" or "couples," as used herein, are intended to mean either an indirect or direct connection. Thus, if a first device couples to a second device, that connection may be through a direct connection, or through an indirect electrical connection or a shaft coupling via other devices and connections.

The present disclosure relates to systems and methods for a botanical processing module. More particularly, the present disclosure relates to systems and methods for physically altering a deposited sample of designated material through an automated process with the botanical processing module.

Figure 1:
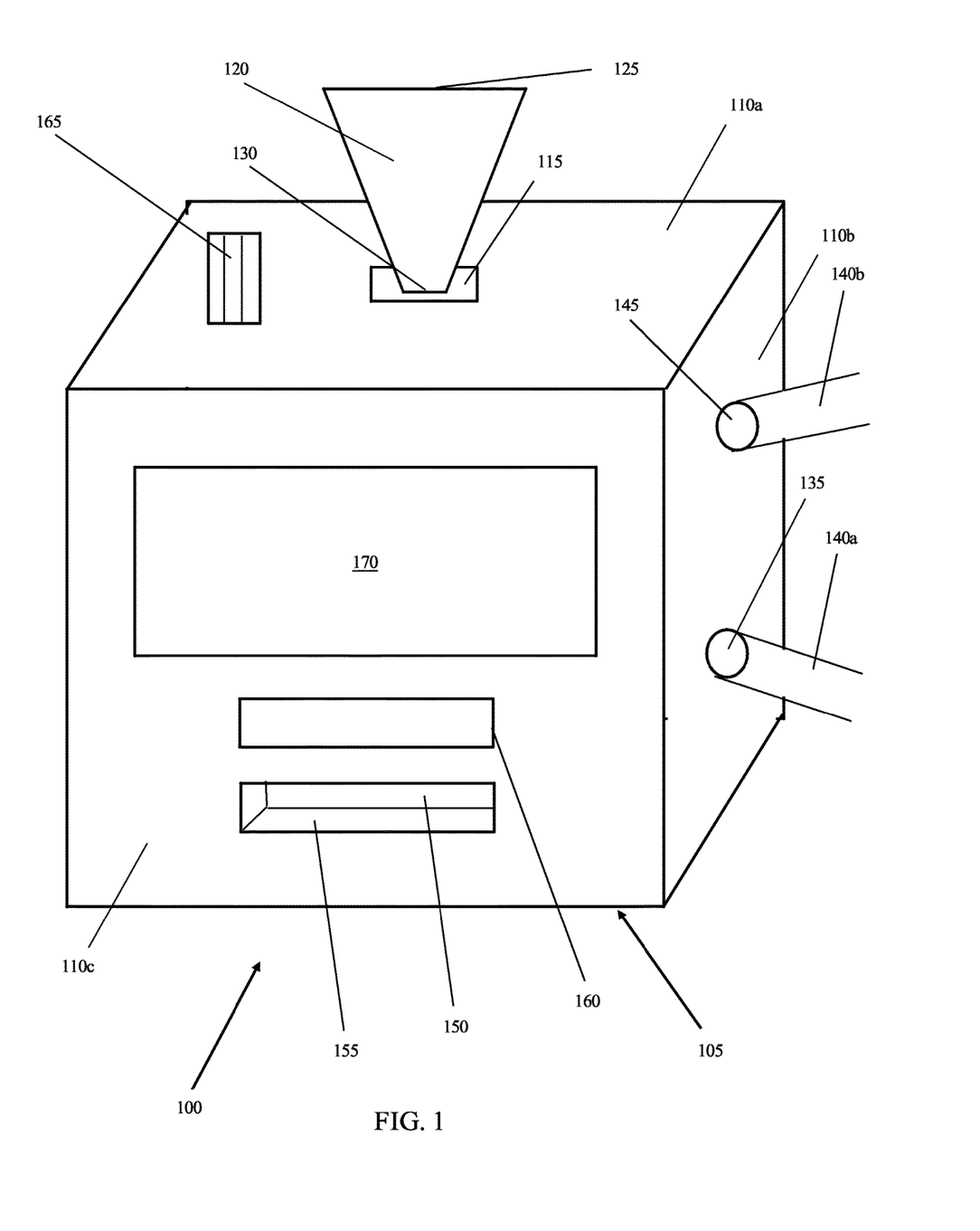
FIG. 1 is an isometric view of a botanical processing module, in accordance with embodiments of the present disclosure.

FIG. 1 illustrates a botanical processing module 100. The botanical processing module 100 may be configured to change the physical state of a designated material deposited therein. In certain embodiments, the botanical processing module 100 may further be configured to change the chemical state of the designated material. In certain embodiments, the botanical processing module 100 may operate automatically once given user input. Without limitations, the botanical processing module 100 may be any suitable size, height, and/or shape. As illustrated, the botanical processing module 100 may comprise a square or rectangular cross-sectional shape. In embodiments, the dimensions, such as height, width, and/or length may be any suitable value. The botanical processing module 100 may comprise any suitable material, including, but not limited to, metals, nonmetals, polymers, ceramics, composites, and/or combinations thereof.

The botanical processing module 100 may comprise a housing 105. In embodiments, the housing 105 may comprise a plurality of surfaces 110. In particular embodiments, for a given surface, the adjacent surfaces may be orthogonal to said given surface. In other embodiments, for a given surface, the adjacent surfaces may be disposed at an angle relative to said given surface. The housing 105 may comprise one or more openings extending through the thickness of a surface 110 of the housing 105. The one or more openings may be functional as either an inlet or an outlet. These one or more openings may be coupled to external equipment through piping and/or conduit. In certain embodiments, there may be a first inlet 115 disposed about a top surface 110a of the housing 105. The first inlet 115 may be any suitable size and/or shape. The first inlet 115 may be configured to allow a material to pass from the exterior of the housing 105 of the botanical processing module 100 to the interior of the housing 105. As illustrated, a funnel 120 may be disposed about the first inlet 115. In embodiments, the funnel 120 may be disposed at least partially through or may be coupled to the first inlet 115. In alternate embodiments, the funnel 120 may be disposed at a distance from the first inlet 115 and coupled to the first inlet 115 via conduit. The funnel 120 may be configured to contain a designated material and to allow said designated material to travel downwards from a top end 125 to a bottom end 130 of the funnel 120 via gravity. In embodiments, the designated material may be any suitable material Without limitations, the designated material may be a portion of plant matter belonging to the Cannabaceae family. Both the top end 125 and the bottom end 130 may be actuable to open or close, thereby sealing the interior of the funnel 120 from the external environment.

In embodiments, there may be a first outlet 135 disposed on a first side surface 110b of the housing 105. While illustrated on first side surface 110b, first outlet 135 may be disposed about any of the plurality of surfaces 110. The first outlet 135 may be any suitable size and/or shape. The first outlet 135 may be capable of allowing material to pass from the interior of the housing 105 to the exterior of the housing 105. As illustrated, the first outlet 135 may be coupled to external equipment and/or tooling via conduit 140a.

In embodiments, there may be a second inlet 145 disposed on the first side surface 110b of the housing 105. While illustrated on first side surface 110b, second inlet 145 may be disposed about any of the plurality of surfaces 110. The second inlet 145 may be any suitable size and/or shape. The second inlet 145 may be capable of allowing material to pass from the exterior of the housing 105 to the interior of the housing 105. As illustrated, the second inlet 145 may be coupled to external equipment and/or tooling via conduit 140*b*.

In embodiments, there may be a second outlet 150 disposed on a second side surface 110*c* of the housing 105. In embodiments, the second side surface 110*c* may be orthogonal to both the top surface 110*a* and the first side surface 110*b*. While illustrated on second side surface 110*c*, second outlet 150 may be disposed about any of the plurality of surfaces 110. The second outlet 150 may be any suitable size and/or shape. The second outlet 150 may be capable of allowing material to pass from the interior of the housing 105 to the exterior of the housing 105. As illustrated, the second outlet 150 may comprise an internal ledge 155. During operations, material may be deposited from the interior of the housing 105 to the internal ledge 155 to be accessible by an operator.

In embodiments, there may be a third inlet 160 disposed on the second side surface 110*c* of the housing 105. While illustrated on second side surface 110*c*, third inlet 160 may be disposed about any of the plurality of surfaces 110. The third inlet 160 may be any suitable size and/or shape. The third inlet 160 may be capable of allowing material to pass from the exterior of the housing 105 to the interior of the housing 105. In embodiments, the third inlet 160 may be configured to function like a printer tray and receive wrap paper, or a similar paper product. The third inlet 160 may receive and contain any suitable amount of wrap paper. During operations, the botanical processing module 100 may manipulate the wrap paper within the housing 105 through such means as rolling, folding, bending, and any combination thereof.

In embodiments, there may be a third outlet 165 disposed on the top surface 110*a* of the housing 105. While illustrated on top surface 110*a*, third outlet 165 may be disposed about any of the plurality of surfaces 110. The third outlet 165 may be any suitable size and/or shape. The third outlet 165 may be configured to vent fumes and/or gases from the interior of the housing 105 to the external environment. During operations, the third outlet 165 may be actuated to either open or close in order to vent potential fumes and/or gases by a controller 170. The controller 170 may be disposed within and/or communicatively coupled to the botanical processing module 100.

Figure 2:
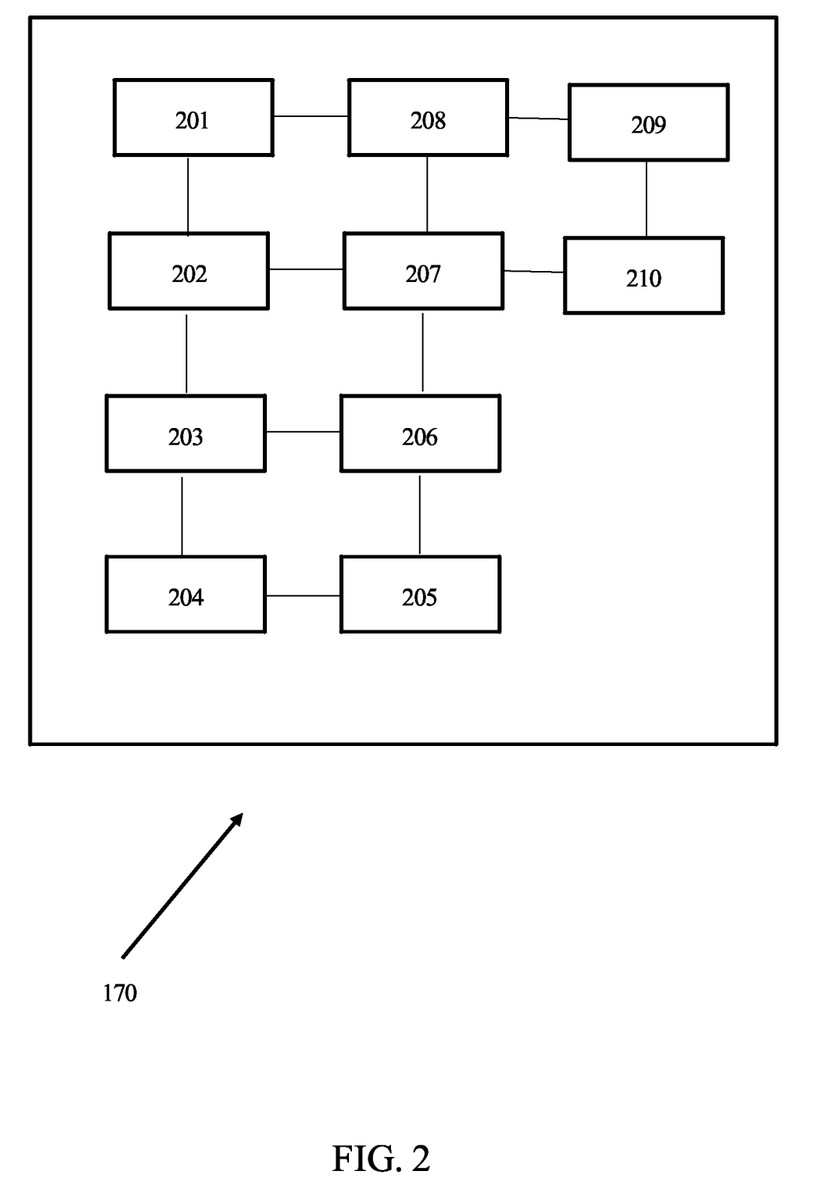
FIG. 2 is a diagram illustrating an example controller, in accordance with embodiments of the present disclosure.

FIG. 2 is a diagram illustrating an example controller 170, according to aspects of the present disclosure. A processor or central processing unit (CPU) 201 of the controller 170 is communicatively coupled to a memory controller hub or north bridge 202. The processor 201 may include, for example a microprocessor, microcontroller, digital signal processor (DSP), application specific integrated circuit (ASIC), or any other digital or analog circuitry configured to interpret and/or execute program instructions and/or process data. Processor 201 may be configured to interpret and/or execute program instructions or other data retrieved and stored in any memory such as memory 203 or hard drive 207. Program instructions or other data may constitute portions of a software or application for carrying out one or more methods described herein. Memory 203 may include read-only memory (ROM), random access memory (RAM), solid state memory, or disk-based memory. Each memory module may include any system, device or apparatus configured to retain program instructions and/or data for a period of time (e.g., computer-readable non-transitory media). For example, instructions from a software or application may be retrieved and stored in memory 203 for execution by processor 201.

Modifications, additions, or omissions may be made to FIG. 2 without departing from the scope of the present disclosure. For example, FIG. 2 shows a particular configuration of components of controller 170. However, any suitable configurations of components may be used. For example, components of controller 170 may be implemented either as physical or logical components. Furthermore, in some embodiments, functionality associated with components of controller 170 may be implemented in special purpose circuits or components. In other embodiments, functionality associated with components of controller 170 may be implemented in configurable general-purpose circuit or components. For example, components of controller 170 may be implemented by configured computer program instructions.

Memory controller hub (MCH) 202 may include a memory controller for directing information to or from various system memory components within the controller 170, such as memory 203, storage element 206, and hard drive 207. The memory controller hub 202 may be coupled to memory 203 and a graphics processing unit (GPU) 204. Memory controller hub 202 may also be coupled to an I/O controller hub (ICH) or south bridge 205. I/O controller hub 205 is coupled to storage elements of the controller 170, including a storage element 206, which may comprise a flash ROM that includes a basic input/output system (BIOS) of the computer system. I/O controller hub 205 is also coupled to the hard drive 207 of the controller 170. I/O controller hub 205 may also be coupled to a Super I/O chip 208, which is itself coupled to several of the I/O ports of the computer system, including keyboard 209 and mouse 210.

In certain embodiments, the controller 170 may contain a set of instructions that when executed cause the processor 201 to perform certain actions. In any embodiment, the controller may include anon-transitory computer readable medium that stores one or more instructions where the one or more instructions when executed cause the processor to perform certain actions. As used herein, an controller may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, a controller may be a computer terminal, a network storage device, or any other suitable device and may vary in size, shape, performance, functionality, and price. The controller may include random access memory (RAM), one or more processing resources such as a central processing unit (CPU) or hardware or software control logic, read only memory (ROM), and/or other types of nonvolatile memory. Additional components of the controller may include one or more disk drives, one or more network ports for communication with external devices as well as various input and output (I/O) devices, such as a keyboard, a mouse, and a video display. In embodiments, an operator may operate the controller 170 via a display disposed on the second side surface 110*c* (referring to FIG. 1). The controller 170 may also include one or more buses operable to transmit communications between the various hardware components. In embodiments, the botanical processing module 100 may comprise a power supply. In alternate embodiments, the botanical processing module 100 may be coupled to an external power supply by any suitable means.

Figure 3:
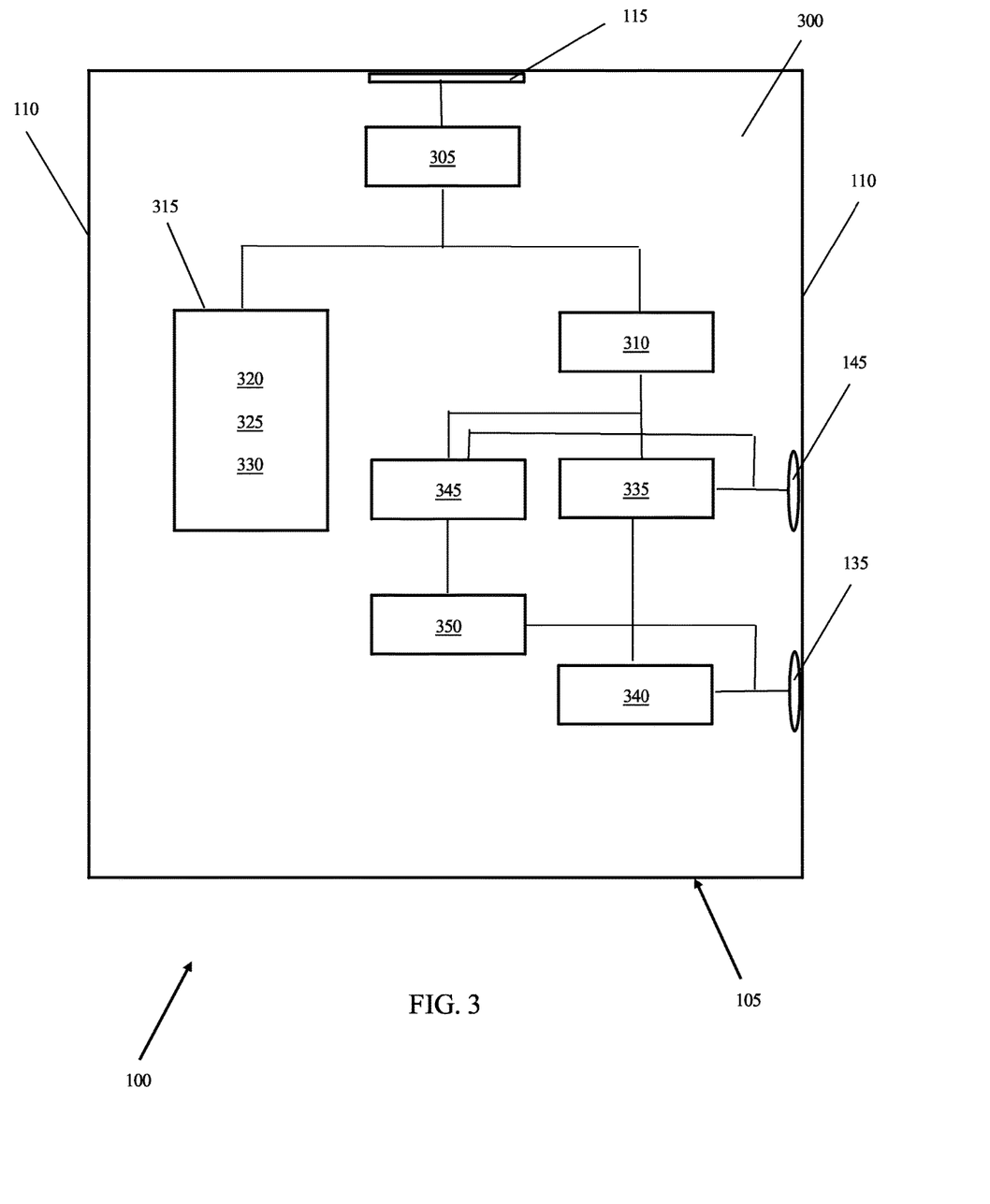
FIG. 3 is a cross-sectional view of a botanical processing module, in accordance with embodiments of the present disclosure.

FIG. 3 illustrates a cross-sectional view of the botanical processing module 100. The housing 105 of the botanical processing module 100 may define an internal cavity 300 between the plurality of surfaces 110. In embodiments, there may be any suitable equipment disposed within the housing 105 in the internal cavity 300 configured to physically and/or chemically change a designated material Without limitations, such equipment may include funnels, pathways, piping, conduit, grinders, screens, filters, rollers, cutters, blades, pulleys, belts, plates, teeth and/or protrusions, and/or combinations thereof. The equipment may be coupled together by any suitable means and/or any suitable fasteners. In embodiments, there may be a motor disposed within the housing 105, wherein operation of the motor actuates at least some of the equipment.

In one or more embodiments, there may be means for physically altering the state of the designated material entering into the botanical processing module 100. Such means may include a grinder 305. In alternate embodiments, the grinder 305 may be replaced with or work concurrently with a shredder, cutters, blades, and any combination thereof. As illustrated, the grinder 305 may be disposed adjacent to or near the first inlet 115. In embodiments, the grinder 305 may be positioned so that the designated material that may pass through the first inlet 115 may be deposited into or onto the grinder 305. In alternate embodiments, the designated material may travel through conduit coupling the first inlet 115 to the grinder 305. The grinder 305 may be configured to reduce the designated material into smaller portions through shearing said designated material once actuated.

As illustrated, the grinder 305 may be coupled to a first heating chamber 310 and a means for packing 315. In embodiments, the first heating chamber 310 may be any suitable size and/or shape. The first heating chamber 310 may be coupled to the grinder 305 directly or through conduit. In embodiments, the first heating chamber 310 may be configured to apply heat to the reduced designated material. Without limitations, the first heating chamber 310 may comprise a heating element configured to raise the temperature within the first heating chamber 310 to about 350° C. In embodiments, the first heating chamber 310 may be sealable in relation to the internal cavity 300.

The first heating chamber 310 may be coupled to a first containment chamber 335. The first heating chamber 310 may be coupled to the first containment chamber 335 directly or through conduit. In embodiments, the first containment chamber 335 may be configured to introduce a fluid from external to the botanical processing module 100 to interact with the heated, reduced designated material In embodiments, the second inlet 145 may be coupled to the first containment chamber 335. The second inlet 145 may be configured to provide liquid carbon dioxide to flow into the first containment chamber 335. In embodiments, the liquid carbon dioxide may be in a supercritical state. In embodiments, the first containment chamber 335 may be capable of being pressurized to a designated pressure. Without limitations, during operations, the first containment chamber 335 may be pressurized so as to allow the liquid carbon dioxide to maintain its state of matter.

As illustrated, the first containment chamber 335 may be coupled to a separator 340. In embodiments, the separator 340 may be a pressure vessel configured to separate a fluid into gaseous and liquid components. The first containment chamber 335 may be coupled to the separator 340 directly or through conduit. As illustrated, the first outlet 135 may be coupled to the separator 340. In embodiments, as the separator 340 operates, the products of the operation of the separator 340 may be transported out of the botanical processing module 100 through the first outlet 135.

In one or more embodiments, the first heating chamber 310 may be coupled to a second containment chamber 345. The first heating chamber 310 may be coupled to the second containment chamber 345 directly or through conduit. In embodiments, the second containment chamber 345 may be configured to introduce a fluid from external to the botanical processing module 100 to interact with the heated, reduced designated material In embodiments, the second inlet 145 may be coupled to the second containment chamber 345. The second inlet 145 may be configured to provide a fluid to flow into the second containment chamber 345. Without limitations, the fluid may be ethanol, butane, pentane, hexane, isopropyl alcohol, acetone, or any other hydrocarbon/alcohol solvent.

As illustrated, the second containment chamber 345 may be coupled to a second heating chamber 350. The second containment chamber 345 may be coupled to the second heating chamber 350 directly or through conduit. As illustrated, the first outlet 135 may be coupled to the second heating chamber. In embodiments, the product of the operation of the second heating chamber 350 may be transported out of the botanical processing module 100 through the first outlet 135. In embodiments, the second heating chamber 350 may be any suitable size and/or shape. In embodiments, the second heating chamber 350 may be configured to apply heat to the mixture of the reduced designated material and the fluid provided through the second inlet 145. Without limitations, the second heating chamber 350 may comprise a heating element configured to raise the temperature within the second heating chamber 350 to any suitable value. Without limitations, such a temperature may be to about 200° C., about 250° C., about 300° C., about 350° C., or about 400° C. The second heating chamber 350 may increase the temperature in order to cause a portion of the fluid present in the mixture to evaporate. One of ordinary skill in the art will recognize that the second heating chamber 350 may be configured to increase the temperature to the point of vaporization for the designated fluid introduced through the second inlet 145. In embodiments, the evaporated fumes or gases may exit the botanical processing module 100 through the first outlet 135 along with the remaining fluid from the mixture.

With reference back to the grinder 305, the grinder 305 may be coupled to the means for packing 315. In embodiments, the means for packing 315 may comprise a conveyor belt 320, a secondary funnel 325, and one or more rollers 330. In one or more embodiments, the secondary funnel 325 may be coupled to the grinder 305 via conduit. The conveyor belt 320 may be disposed within the internal cavity 300 so as to connect the third inlet 160 (referring to FIG. 1) to the second outlet 150 (referring to FIG. 1). The one or more rollers 330 may be disposed along a portion of the conveyor belt 320 between the secondary funnel 325 and the second outlet 150. In embodiments, the conveyor belt 320 may be configured to transport the wrap paper from the third inlet 160 to the second outlet 150. The secondary funnel 325 may be configured to dispense reduced designated material from the grinder 305 onto at least a portion of each unit of wrap paper as it is transported on the conveyor belt 320. The one or more rollers 330 may be configured to roll each one of the wrap papers with reduced designated material disposed thereon into generally cylindrical shapes. In embodiments, the conveyor belt 320 may deposit individually rolled wrap papers containing reduced designated material onto the internal ledge 155 (referring to FIG. 1) of the second outlet 150.

Figure 4:
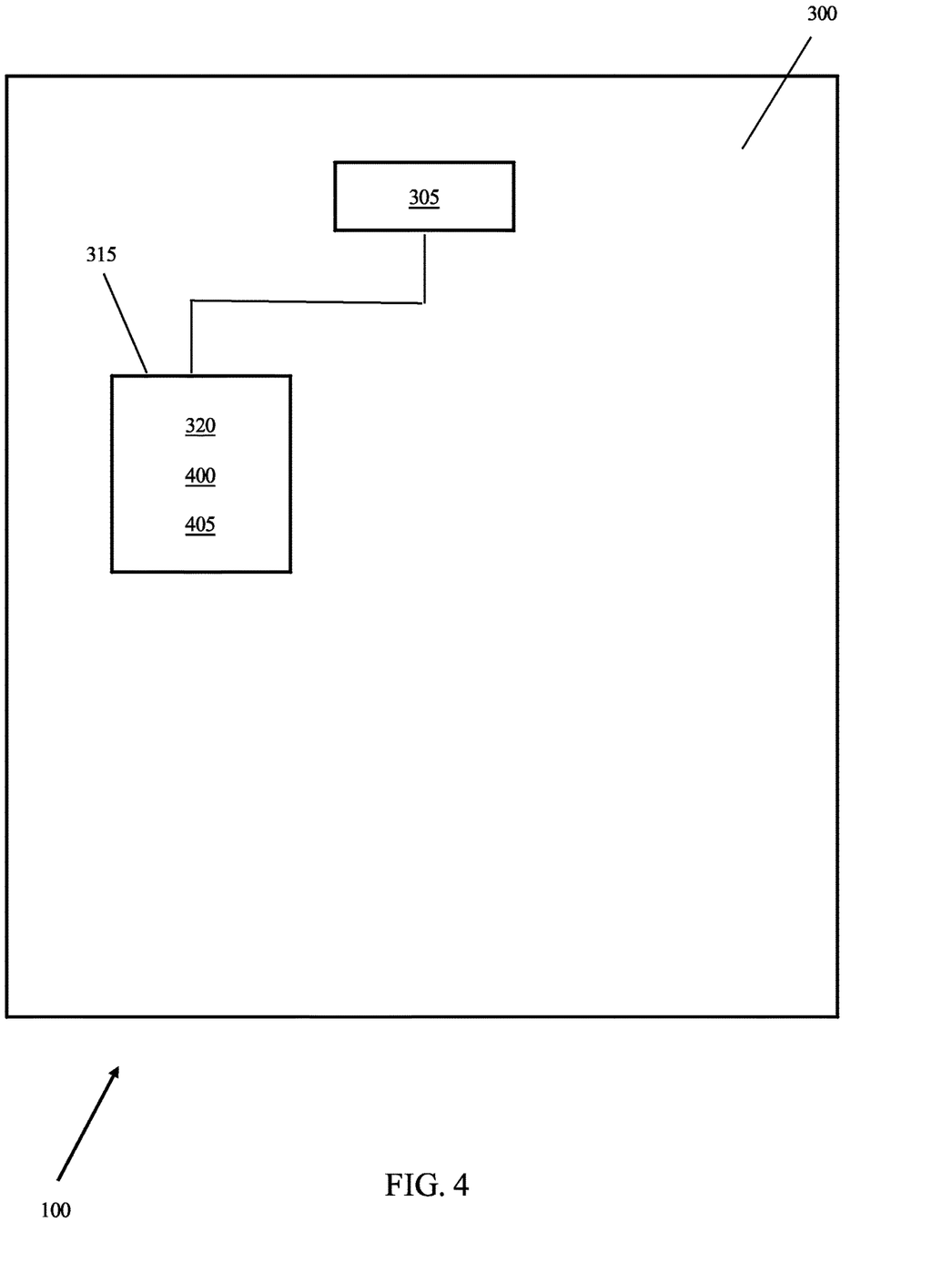
FIG. 4 is a cross-sectional view of a botanical processing module, in accordance with embodiments of the present disclosure.

FIG. 4 illustrates a cross-sectional view of another embodiment of the botanical processing module 100. The embodiment illustrated in FIG. 4 may comprise each component previously described in FIG. 3 with differences present in the means for packing 315. In the present embodiment, the means for packing 315 may comprise a packer container 400, a packing rod 405, and the conveyor belt 320. In this embodiment, the packer container 400 may be coupled to the grinder 305 via conduit. The packer container 400 may be configured to contain the reduced designated material for a period of time. The packer container 400 may be actuated to dispense a portion of the reduced designated material disposed within the packer container 400. The packer rod 405 may be disposed adjacent to the packer container 400 and aligned so that the dispensed portion of reduced designated material is within the path of motion of the packer rod 405. The conveyor belt 320 may be disposed within the internal cavity 300 so as to connect the third inlet 160 (referring to FIG. 1) to the second outlet 150 (referring to FIG. 1). The conveyor 320 may be similarly configured to transport materials from the third inlet 160 to the second outlet 150. In the present embodiment, the third inlet 160 may receive and contain pre-rolled wrap papers, wherein the pre-rolled wrap papers are in a cylindrical shape. The conveyor 320 may comprise partitions (not shown) so as to orient the pre-rolled wrap papers in a certain configuration. In embodiments, the packer rod 405 may be actuated to move linearly and force the dispensed portion of reduced designated material into one of the pre-rolled wrap papers once the one of the pre-rolled wrap papers is in-line with the path of motion of the packer rod 405. In embodiments, the conveyor belt 320 may deposit each pre-rolled wrap paper containing reduced designated material onto the internal ledge 155 (referring to FIG. 1) of the second outlet 150.

During operations, with reference to the figures, an operator may dispose designated material into the botanical processing module 100 through the first inlet 115. Any suitable amount or volume of designated material may be disposed into the botanical processing module 100. Once the operator disposes the designated material into the botanical processing module 100, the operator may choose any suitable operation to be performed via the controller 170. In embodiments, the controller 170 may instruct the botanical processing module 100 to prepare rolled wrap papers comprising a portion of reduced designated material and/or produce a desired by-product to be collected from the first outlet 135. In certain embodiments, the controller 170 may control the dispensation of reduced designated material from the grinder 305 into individual wrap papers and/or pre-rolled wrap papers. In these embodiments, the controller 170 may control the speed of the conveyor belt 320 and the timing and location of wrap papers disposed on the conveyor belt 320 in relation to either the secondary funnel 325 or the packing rod 405. In embodiments, the controller 170 may instruct the first heating chamber 310 to increase the temperature to a designated value for a period of time. Without limitations, such a period of time may be anywhere from about 5 minutes to about 5 hours. In similar embodiments, the controller 170 may instruct the second heating chamber 350 to increase the temperature to a designated value for a period of time, wherein the period of time may be similar to the period of time used for the first heating chamber 310.

In embodiments, the botanical processing module 100 may apply a solvent and/or liquid carbon dioxide to the designated material through the second inlet 145. This may occur after the process of grinding and/or shredding the designated material with the grinder 305. The solvent and/or liquid carbon dioxide may surround, encompass, pass through, and/or combinations thereof the reduced designated material for a suitable amount of time to produce a mixture. In these embodiments, the mixture may undergo a further process through either the separator 340 or the second heating chamber 350 then may flow out of the botanical processing module 100 through the first outlet 135. In embodiments, the mixture may be disposed in an external container for further processing.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces.

What is claimed is:

1. A botanical processing module, comprising:
   a housing having a plurality of walls defining an internal cavity, including:
   a first inlet extending through a top wall surface of the housing for the introduction of a designated material to be processed into the internal cavity;
   a second inlet extending through a side wall surface of the housing for introduction of a fluid to be mixed with the designated material into the internal cavity;
   a first outlet extending through the side wall surface for the discharge of a produced mixture from the internal cavity;
   a grinder disposed within the internal cavity of the housing and positioned to:
   receive the designated material from the first inlet, and
   reduce the designated material into smaller portions through shearing;
   a first heating chamber disposed within the internal cavity of the housing and downstream of the grinder, the first heating chamber being sized, shaped and positioned to receive the reduced smaller portions of the designated material from the grinder, first heating chamber including means for increasing the temperature of the reduced designated material within the first heating chamber; and a controller including a processor, configured to:
   transmit an instruction to actuate the grinder to reduce the designated material into the smaller portions; and
   transmit an instruction to actuate the means for increasing the temperature of the reduced designated material within the first heating chamber to increase the temperature of the reduced designated material within the first heating chamber.

2. The botanical processing module of claim 1, further comprising a first containment chamber and a separator.

3. The botanical processing module of claim 2, wherein the first containment chamber and the separator are disposed within the housing in the internal cavity, wherein the first containment chamber is in fluid communication with the first heating chamber and the separator.

4. The botanical processing module of claim 2, wherein the first containment chamber is in fluid communication with the second inlet, wherein the separator is in fluid communication with the first outlet.

5. The botanical processing module of claim 2, further comprising a second containment chamber and a second heating chamber.

6. The botanical processing module of claim 5, wherein the second containment chamber and the second heating chamber are disposed within the housing in the internal cavity, wherein the second containment chamber is in fluid communication with the first heating chamber and the second heating chamber.

7. The botanical processing module of claim 5, wherein the second containment chamber is in fluid communication with the second inlet, wherein the second heating chamber is in fluid communication with the first outlet.

8. The botanical processing module of claim 1, further comprising:
   a first containment chamber;
   a separator;
   a second containment chamber; and
   a second heating chamber,
   wherein the first containment chamber, the separator, the second containment chamber, and the second heating chamber are disposed within the housing in the internal cavity, wherein the first containment chamber is in fluid communication with the first heating chamber and the separator, wherein the first containment chamber is in fluid communication with the second inlet, wherein the separator is in fluid communication with the first outlet, wherein the second containment chamber is in fluid communication with the first heating chamber and the second heating chamber, wherein the second containment chamber is in fluid communication with the second inlet, wherein the second heating chamber is in fluid communication with the first outlet.

9. The botanical processing module of claim 8, further comprising:
   a second outlet extending through the top wall surface operable to vent gases from within the internal cavity of the housing to an external environment.

10. The botanical processing module of claim 1, further comprising:
   a second outlet extending through the top wall surface operable to vent gases from within the internal cavity of the housing to an external environment.

11. The botanical processing module of claim 1, further comprising:
   a funnel above the top wall surface, wherein an outlet of the funnel is in fluid communication with the first inlet to direct the designated material into the first inlet.

12. The botanical processing module of claim 1, wherein the means for increasing the temperature of the reduced designated material within the first heating chamber comprises a heating element capable of increasing the temperature within the first heating chamber to 350° C.

* * * * *